US012577971B2

(12) United States Patent
Cannata

(10) Patent No.: US 12,577,971 B2
(45) Date of Patent: Mar. 17, 2026

(54) HYDRAULIC DEVICE WITH CASE DRAIN SYSTEM

(71) Applicant: Tonand Inc.

(72) Inventor: Antonio Cannata, London (CA)

(73) Assignee: TONAND INC., London (CA)

( * ) Notice: Subject to any disclaimer, the term of this patent is extended or adjusted under 35 U.S.C. 154(b) by 0 days.

(21) Appl. No.: 18/971,635

(22) Filed: Dec. 6, 2024

(65) Prior Publication Data

US 2025/0188964 A1 Jun. 12, 2025

Related U.S. Application Data

(60) Provisional application No. 63/608,338, filed on Dec. 11, 2023.

(51) Int. Cl.
*F15B 21/00* (2006.01)
*F04B 53/04* (2006.01)

(52) U.S. Cl.
CPC ............ *F15B 21/005* (2013.01); *F04B 53/04* (2013.01)

(58) Field of Classification Search
CPC ....... F15B 21/005; F15B 21/044; F04B 53/04
See application file for complete search history.

(56) References Cited

U.S. PATENT DOCUMENTS 4,628,881 A * 12/1986 Beck .................. F02M 63/0225 239/96
5,201,174 A * 4/1993 Barber ..................... B62D 5/30 60/486
11,994,121 B1 * 5/2024 Cannata ................ F04B 1/0435

FOREIGN PATENT DOCUMENTS

WO WO-2013092614 A1 * 6/2013 .............. F04B 53/16

* cited by examiner

*Primary Examiner* — Abiy Teka

(57) ABSTRACT

A hydraulic device comprising: a housing having an inlet for receiving hydraulic fluid and an outlet for outputting the hydraulic fluid, the housing having a case area for holding case fluid; a primary cylinder positioned in the housing along a first reciprocation axis, the primary cylinder in fluid communication with the inlet for receiving the hydraulic fluid on a primary intake stroke and in fluid communication with the outlet for ejecting the hydraulic fluid on a primary exhaust stroke; a primary piston positioned for a first reciprocal motion within the primary cylinder along the first reciprocation axis, the primary piston coupled to an actuator; a drain cylinder positioned in the housing along a second reciprocation axis; a case inlet for receiving the case fluid, the case inlet located in the case area and fluidly coupled to the drain cylinder; a case outlet for outputting the case fluid, the case outlet fluidly coupled to the drain cylinder; a drain piston positioned for a second reciprocal motion within the drain cylinder along the second reciprocation axis, the drain piston exposed to the case fluid in the drain cylinder and coupled to the actuator; wherein a portion of the hydraulic fluid becomes the case fluid when the portion enters the case area and the second reciprocal motion causes the case fluid to be transferred from the case inlet to the case outlet.

22 Claims, 3 Drawing Sheets

HYDRAULIC DEVICE WITH CASE DRAIN SYSTEM

The present disclosure claims priority to U.S. Provisional Patent Application No. 63/608,338 filed Dec. 11, 2023, the entire contents of which are incorporated herein by reference.

FIELD

Hydraulic pumps and motors are used predominantly in industry when mechanical actuation is desired to convert hydraulic pressure and flow into torque and angular (rotation). Examples of hydraulic application can be in braking systems, propulsion systems (e.g. automotive, drilling) as well as in electrical energy generation systems (e.g. windmills). Other common uses of hydraulic devices as a direct drive system can be in drilling rigs, winches and crane drives, wheel motors for vehicles, cranes, and excavators, conveyor and feeder drives, mixer and agitator drives, roll mills, drum drives for digesters, kilns, trench cutters, high-powered lawn trimmers, and plastic injection machines. Further, hydraulic pumps, motors, can be combined into hydraulic drive systems, for example one or more hydraulic pumps coupled to one or more hydraulic motors constituting a hydraulic transmission.

BACKGROUND

Due to currently available configurations, there exists disadvantages with hydraulic devices when operated in systems exhibiting dynamic variation fluid flow requirements. For example, the torque requirements of a load in a hydraulic system can dynamically change, such that the hydraulic device must instantaneously react to the changing flow conditions dictated by the dynamic change in the torque.

Further, in currently available configurations of hydraulic devices, there exists decreased operational efficiencies due to blowby fluid that does not perform any useful work and is instead simply returned to tank via a return line, for example. There is a need to increase efficiencies of hydraulic devices, in particular in providing one or more systems to utilize case fluid to perform useful work. The ability to utilize case fluid to perform useful work can contribute to increasing the operational efficiency of the hydraulic device.

SUMMARY

It is an object of the present invention to provide a hydraulic device to obviate or mitigate at least some of the above presented disadvantages.

A first aspect provided is a hydraulic device comprising: a housing having an inlet for receiving hydraulic fluid and an outlet for outputting the hydraulic fluid, the housing having a case area for holding case fluid; a primary cylinder positioned in the housing along a first reciprocation axis, the primary cylinder in fluid communication with the inlet for receiving the hydraulic fluid on a primary intake stroke and in fluid communication with the outlet for ejecting the hydraulic fluid on a primary exhaust stroke; a primary piston positioned for a first reciprocal motion within the primary cylinder along the first reciprocation axis, the primary piston having a first end exposed to the hydraulic fluid and a second end coupled to an actuator; the actuator for driving the second end to cause the first reciprocal motion for inducing said ejecting of the hydraulic fluid, the actuator mounted on a shaft; a drain cylinder positioned in the housing along a second reciprocation axis; a case inlet for receiving the case fluid, the case inlet located in the case area and fluidly coupled to the drain cylinder; a case outlet for outputting the case fluid, the case outlet fluidly coupled to the drain cylinder; a drain piston positioned for a second reciprocal motion within the drain cylinder along the second reciprocation axis, the drain piston having a third end exposed to the case fluid in the drain cylinder and a fourth end coupled to the actuator; wherein a portion of the hydraulic fluid becomes the case fluid when the portion enters the case area and the second reciprocal motion causes the case fluid to be transferred from the case inlet to the case outlet.

A second aspect provided is a method for operating a hydraulic device including a housing with a case area for holding case fluid, the hydraulic device coupled to a hydraulic fluid reservoir containing hydraulic fluid, the method comprising the steps of: rotating an actuator, the actuator coupled to a primary piston and a drain piston; using the actuator to operate the primary piston within a primary cylinder of the housing in a first reciprocal motion, the primary cylinder receiving the hydraulic fluid on a primary intake stroke and ejecting the hydraulic fluid on a primary exhaust stroke; using the actuator to operate the drain piston within a drain cylinder of the housing in a second reciprocal motion, the drain cylinder receiving the case fluid on a case intake stoke and outputting the case fluid on a case exhaust stroke; wherein a portion of the hydraulic fluid becomes the case fluid when the portion enters the case area and the second reciprocal motion causes the case fluid to be transferred from the case inlet to the case outlet.

A further aspect provided is a hydraulic device comprising: a housing having an inlet for receiving hydraulic fluid and an outlet for outputting the hydraulic fluid, the housing having a case area for holding case fluid; a primary cylinder positioned in the housing along a first reciprocation axis, the primary cylinder having an input in fluid communication with the inlet for receiving the hydraulic fluid on a primary intake stroke and an output in fluid communication with the outlet for ejecting the hydraulic fluid on a primary exhaust stroke; a primary piston positioned for a first reciprocal motion within the primary cylinder along the first reciprocation axis, the primary piston having a first end exposed to the hydraulic fluid and a second end coupled to an actuator; the actuator being driven by the second end via the first reciprocal motion, the actuator mounted on the shaft such that the shaft is rotated by the actuator; a drain cylinder positioned in the housing along a second reciprocation axis; a case inlet for receiving the case fluid, the case inlet located in the case area and fluidly coupled to the drain cylinder; a case outlet for outputting the case fluid, the case outlet fluidly coupled to the drain cylinder; a drain piston positioned for a second reciprocal motion within the drain cylinder along the second reciprocation axis, the drain piston having a third end exposed to the case fluid in the drain cylinder and a fourth end coupled to the actuator; wherein a portion of the hydraulic fluid becomes the case fluid when the portion enters the case area and the second reciprocal motion causes the case fluid to be transferred from the case inlet to the case outlet.

A further aspect provided is a method for operating a hydraulic device including a housing with a case area for holding case fluid, the hydraulic device coupled to a hydraulic fluid reservoir containing hydraulic fluid, the method comprising the steps of: operating the primary piston within a primary cylinder of the housing in a first reciprocal motion, the primary cylinder receiving the hydraulic fluid on a primary intake stroke and ejecting the hydraulic fluid on a primary exhaust stroke; driving an actuator by the first reciprocal motion, the actuator coupled to the primary piston, the actuator mounted on a shaft such that said driving causes rotation of the shaft; operating the drain piston within a drain cylinder of the housing in a second reciprocal motion facilitated by said rotating, the drain cylinder receiving the case fluid on a case intake stoke and outputting the case fluid on a case exhaust stroke, the drain piston coupled to the actuator; wherein a portion of the hydraulic fluid becomes the case fluid when the portion enters the case area and the second reciprocal motion causes the case fluid to be transferred from the case inlet to the case outlet.

BRIEF DESCRIPTION OF THE DRAWINGS

The foregoing and other aspects will now be described by way of example only with reference to the attached drawings, in which.

DETAILED DESCRIPTION

Figure 1:
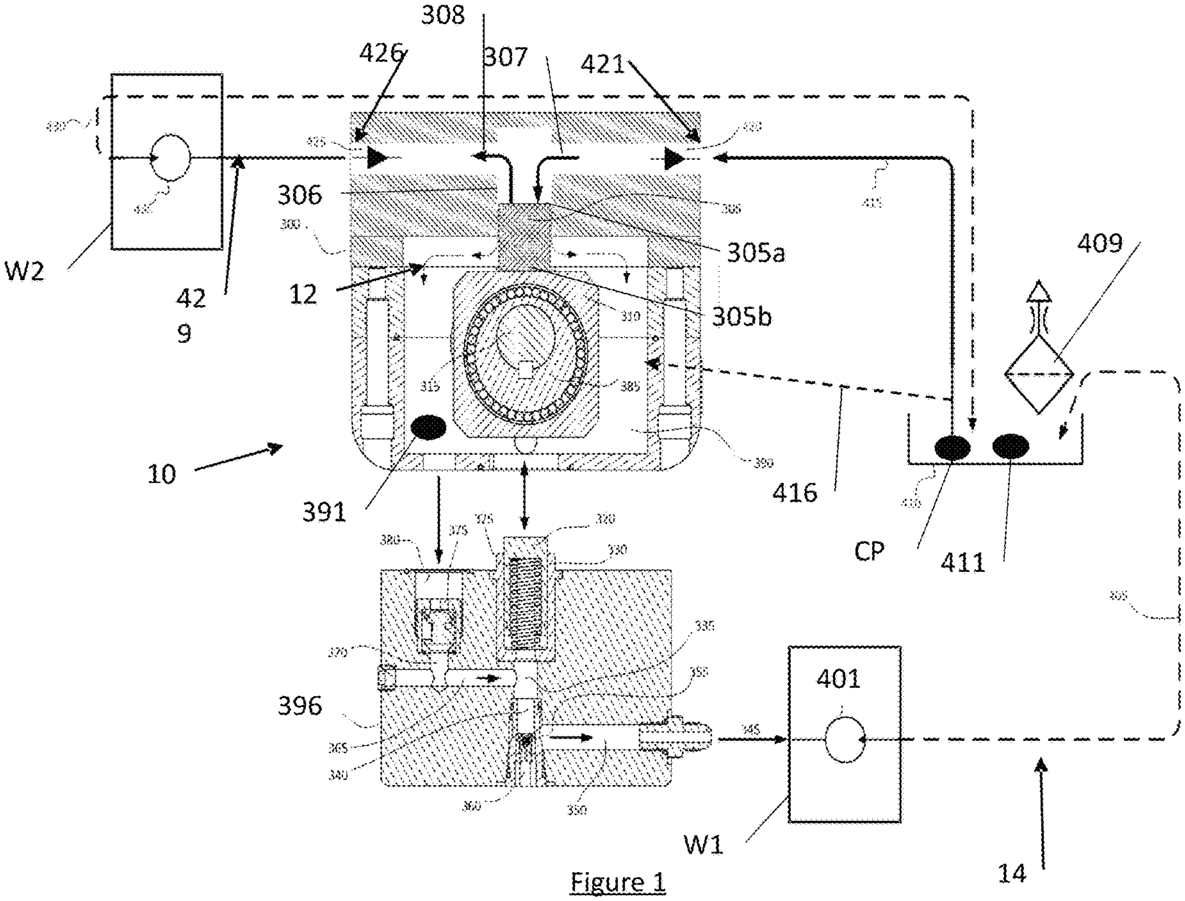
FIG. 1 refers to a hydraulic circuit for a first embodiment of a hydraulic device.

Referring to FIG. 1, shown is a hydraulic device 10 (e.g. a pump or a motor) having a housing 300 with an inlet 421 for receiving hydraulic fluid 411 (e.g. from a fluid reservoir 410) and an outlet 426 for outputting the hydraulic fluid 411, the housing 300 having a case area 390 (e.g. oil pan, crank case, etc.) for holding case fluid 391. The case fluid 391 is provided by blow by (e.g. hydraulic fluid 411 escaping 12 between the walls of the main cylinder 306 and the main piston 305. As such, any hydraulic fluid 411 that does not travel between the inlet 421 and the outlet 426, but rather escapes 12 into the case area 390, is considered the case fluid 391. As further described below, a case drain piston 320 is used to pump the case fluid 391 from the case area 390, such that the case fluid 391 evacuated from the case area 390 is returned via a return line 405 (e.g. to the fluid reservoir 410). In this manner, any blow-by fluid, i.e. case fluid 391, can be returned to the hydraulic system 14 to participate in useful work W1 (e.g. a motor 401 driven by case fluid 391 flow). It is also recognized that the case fluid 391 via the return line 405 can be used as further output fluid (406) of the hydraulic device 10. It is also recognized that a charge pump CP located in the reservoir 410, for example, can be used to supply (via an optional supply line 416) or otherwise augment the amount of case fluid 391 in the case area 390.

Figure 2:
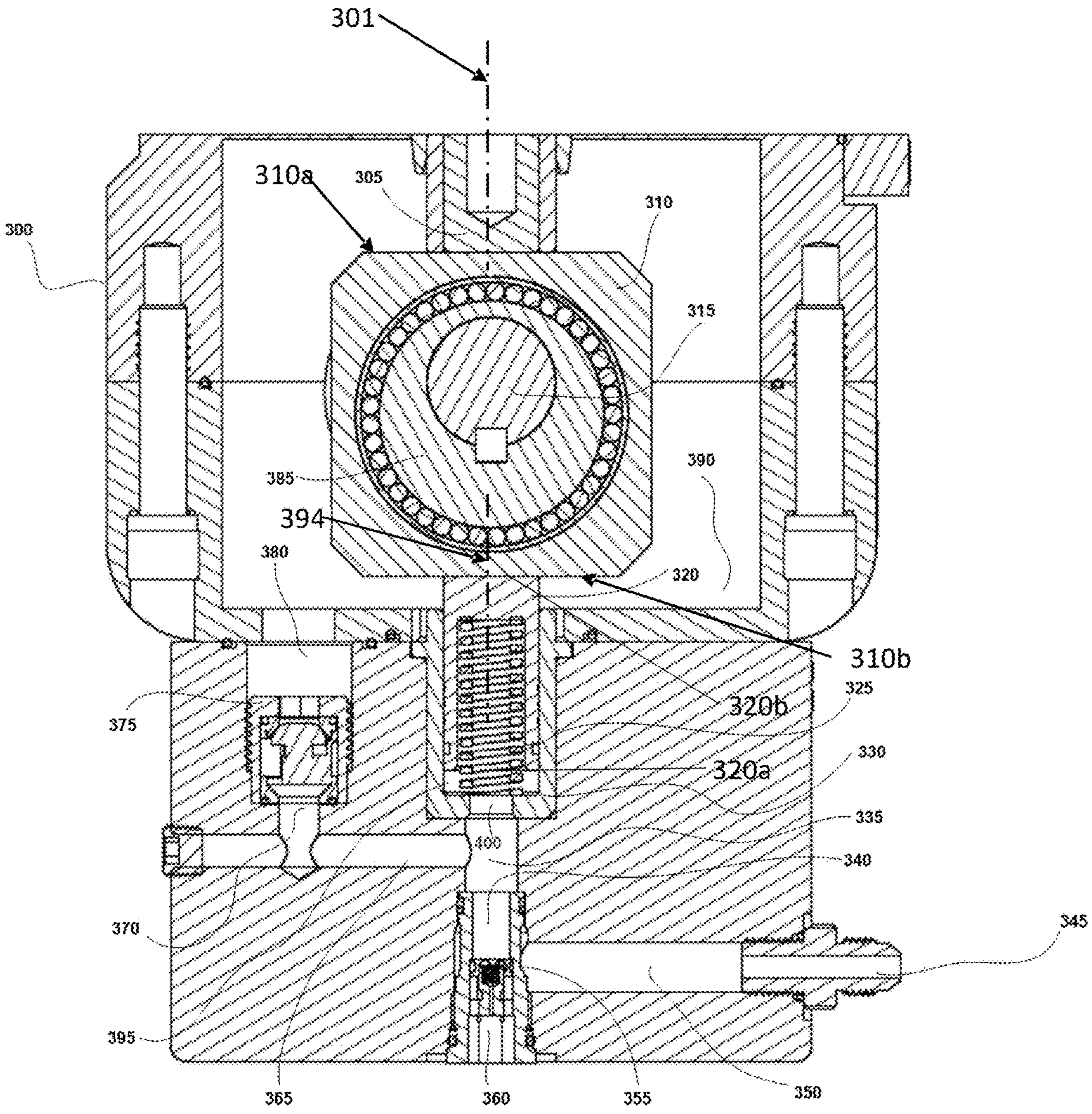
FIG. 2 is an view of the hydraulic device of FIG. 1 completing an exhaust stroke.

Referring again to FIG. 1, the case drain piston 320 is positioned in a case drain cylinder (e.g. sleeve) 330 (see FIG. 2) positioned in a case drain housing 396, which is coupled (e.g. bolted) to the main housing 300. As further discussed below, an actuator 310 is used to drive (e.g. reciprocate) both the main piston 305 (in the main cylinder 306) and the corresponding case drain piston 320 (in the case drain cylinder 330). It is recognized that a number of main pistons 305, each with a corresponding respective actuator 310 and respective opposed case drain piston 320 can be included in the hydraulic device 10, such that the output of the main pistons 305 is via the outlet 426 and the output of the case drain pistons 320 is via an outlet port 345. In other words, the plurality of main pistons 305 can contribute to the output 426 flow of the hydraulic fluid 411 from the hydraulic device 10 and the plurality of case drain pistons 320 can contribute to the output 345 flow of the case fluid 391 from the hydraulic device 10. For the ease of explanation only, the following discussion of the case drain operation is illustrated using a case drain piston 320, actuator 310 and main piston 305 by example only.

Referring again to FIG. 1, the main piston 305 is driven (e.g. reciprocates in the cylinder 306) by the actuator 310. The actuator 310 is mounted on a main shaft 315 (e.g. thus rotated by reciprocation of the main piston 305 during operation of the hydraulic device 10 as a pump) and the corresponding offset cam 385. As shown by example, the main piston 305 can become decoupled from an actuation surface 310*a* if the flow of inlet 421 hydraulic fluid is stopped (e.g. in this case the main piston 305 would be driven to and then reside at TDC in the main cylinder 306 (TDC position shown in FIG. 3 by example with BDC position shown by example in FIGS. 1 and 3). The case drain piston 320 has a return biasing element (e.g. spring) 325 in order to bias the case drain piston 320 into contact with an actuator surface 310*b* during reciprocation of the case drain piston 320. As such, the case drain piston 320 can act as an anti-rotation device of the hydraulic device 10, such that if the main piston 305 becomes decoupled from the actuator surface 310*a*, then the actuator surface 310*a* stays aligned with the main piston 305 during rotation of the offset cam 385 (as driven by rotation of the shaft 315—not shown).

Referring again to FIG. 1, shown is an inlet volume holding bore 380 (e.g. an inlet well) positioned towards a bottom of the case area 390. In this manner, the case fluid 391 can flow by gravity into the inlet well 380 and thus facilitate that case fluid 391 is available to an inlet passage 365 of the case drain piston 320 during reciprocation (e.g. when the case drain piston 320 is travelling from BDC to TDC during an intake stroke). Also provided can be an inlet check valve 375 having an outlet side 370 for filling the inlet passage 365 with case fluid 391 obtained from the case area 390.

Figure 3:
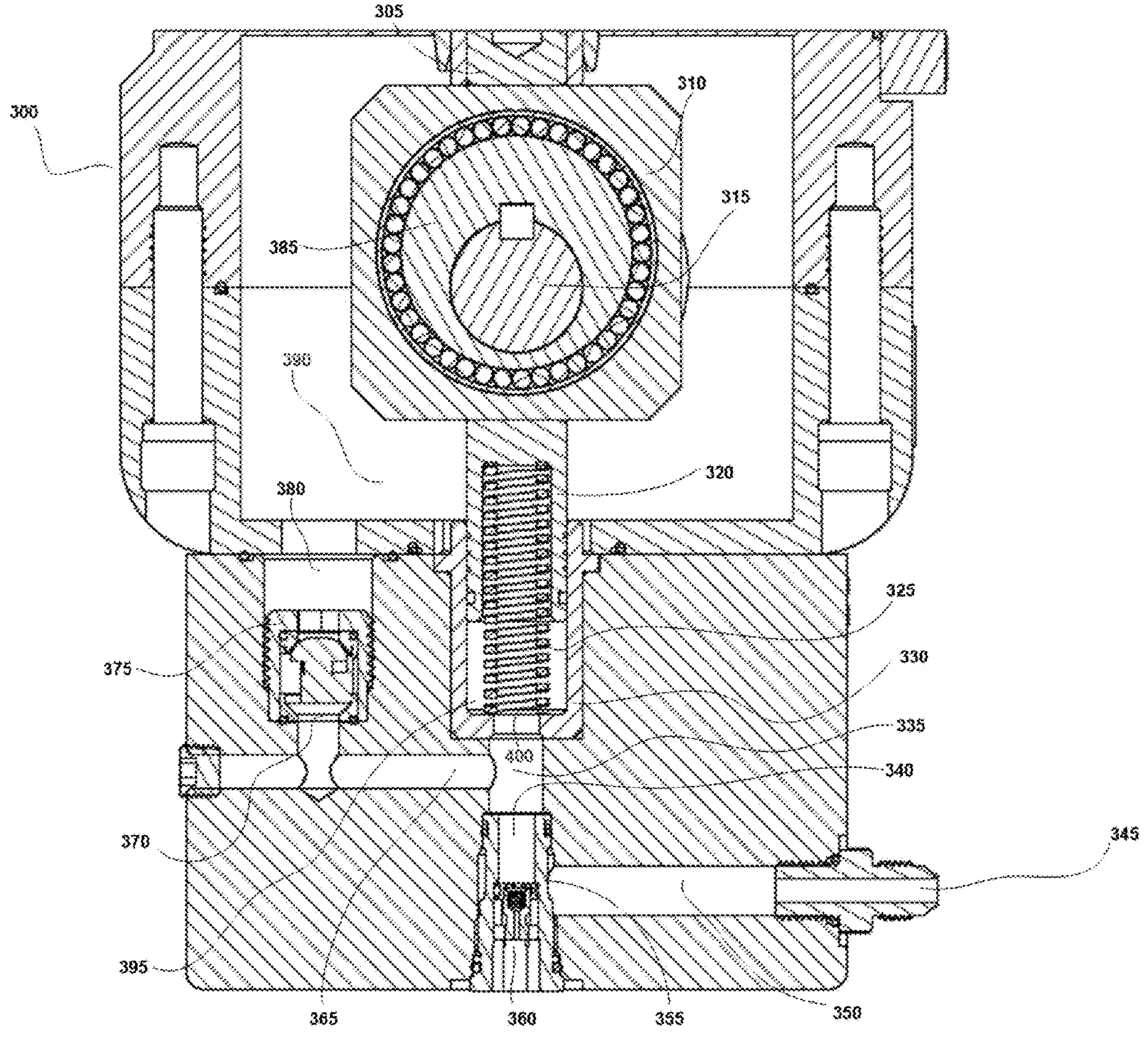
FIG. 3 is a view of the hydraulic device of FIG. 1 completing an intake stroke.

The case drain cylinder 330 has an inlet/outlet port 400 positioned between an inlet/outlet passage port 335 and a case drain piston bore volume 395. Thus any case fluid 391 drawn by the case drain piston 330 (e.g. during an intake stroke of the case drain piston 320 due to the bias of the spring 325), out of the case area 390, travels from the inlet well 380 through the inlet check valve 375 and then along the inlet passage 365 and into the bore volume 395 via the inlet/outlet port 400. FIG. 3 shows the case drain piston 320 at BDC and thus the bore volume 395 is full of case fluid 391 obtained from the case area 390.

On the downward (e.g. exhaust) stroke of the case drain piston 320, any resident case fluid 391 in the bore volume 395 is pushed through the inlet/outlet port 400 and into the inlet/outlet passage 335. As the case fluid 391 continues to fill the inlet/outlet passage 335, case fluid enters inlet port 340 of outlet check valve 360 and thus exits outlet port 355. Any case fluid 391 exiting the outlet port 355 thus enters an outlet passage 350 and is directed to the outlet port 345 of the case drain housing 396. Referring to FIG. 1, shown is the case drain piston 320 at TDC and thus at the completion of its exhaust stroke. Any case fluid 391 exiting the outlet port 345 is deposited in the return line 405 and thus capable of doing work W1, e.g. driving a motor 401 shown by example. It is also recognized that alternatively the work W1 can be provided as a low pressure heat exchanger system (to remove heat from the case fluid 391) and thus to help cool down the hydraulic fluid 411.

Referring again to FIG. 1, in terms of an example hydraulic system 14, the hydraulic device 10 includes the main housing 300 and the connected case drain housing 396, and is located in the example hydraulic circuit 14 including the fluid reservoir 410 connected to the main inlet port 421 by an inlet (e.g. suction) line 415. Any hydraulic fluid 411 provided from the fluid reservoir 410 (e.g. provided by a charge pump CP located in the fluid reservoir 410) passes through the inlet check valve 420 and thus is drawn 307 into the main cylinder 306 when the main piston 305 travels from TDC to BDC. Shown in FIG. 1 is the main piston 305 at BDC and the main piston 305 is in contact with the actuator surface 310*a* (e.g. the main piston 305 is following the actuator 310 as the main piston reciprocates in the main cylinder 306). Upon travel from BDC to TDC (not shown), any hydraulic fluid 411 resident in the main cylinder 306 is expelled 308 towards the outlet port 426 via the outlet check valve 425. Once exiting the housing 300, the hydraulic fluid 411 enters a return line 429 and does work W2 (e.g. drives a motor 435). Once the work W2 has been completed, the hydraulic fluid 411 can enter a low pressure return line 430 and flow back to the reservoir 410 (e.g. vented 409 to atmosphere). It is recognized that any case fluid 391 present in the low pressure return line 405 can be used in low pressure heat exchanger systems (as W1), as desired, before being returned to the fluid reservoir to once again become hydraulic fluid 411 for subsequent use as the hydraulic fluid 411 in the inlet line 415.

In view of the above, the hydraulic device 10 (operating by example as a pump) can utilize the housing 300,396 having the inlet 421 for receiving the hydraulic fluid 411 and the outlet 426 for outputting the hydraulic fluid 411, such that the housing 300 has the case area 390 for holding the case fluid 391. Any hydraulic fluid 411 bypassing (e.g. travelling between the main piston 305 and the walls of the main cylinder 306) the main piston 305 (e.g. when travelling between the inlet 421 and the outlet 426) enters the case area 390 and becomes the case fluid 391. The hydraulic device 10 further has the primary (e.g. main) cylinder 306 positioned in the housing 300 along a first reciprocation axis 301, the primary cylinder 306 having the input 421 in fluid communication with the inlet line 415 for receiving the hydraulic fluid 411 on a primary intake stroke and an output 426 in fluid communication with the outlet/return line 426 for ejecting the hydraulic fluid 411 from the housing 300 on a primary exhaust stroke. The primary cylinder 306 has the primary (e.g. main) piston 305 positioned for a first reciprocal motion within the primary cylinder 306 along the first reciprocation axis 301, the primary piston 305 having a first end 305*a* exposed to the hydraulic fluid 411 and a second end 305*b* coupled to the actuator surface 310*a* (see FIG. 2). The actuator 310 is used for driving the second end 305*b* to cause the first reciprocal motion for inducing the ejecting of the hydraulic fluid 411, such that the actuator 310 is mounted on the shaft 315. In conjunction with the primary piston 305 and primary cylinder 306, provided is a drain cylinder 330 positioned in the housing 300,396 along a second reciprocation axis 394. Further, the case inlet passage 365 is for receiving the case fluid 391, the case inlet passage 365 fluidly coupled to the case area 390 and fluidly coupled to the drain cylinder 330. Further, the case outlet passage 350 is for outputting the case fluid 391, the case outlet passage 350 also fluidly coupled to the drain cylinder 330. The drain piston 320 is positioned for a second reciprocal motion within the drain cylinder 330 along the second reciprocation axis 394, the drain piston 320 having a third end 320*a* exposed to the case fluid 391 in the drain cylinder 330 and a fourth end 320*b* coupled to the actuator 310 (see FIG. 2). During operation of the hydraulic device 10, a portion of the hydraulic fluid 411 becomes the case fluid 391 when the portion enters the case area 390 and the second reciprocal motion causes the case fluid 391 to be transferred from the case inlet passage 365 to the case outlet passage 350.

In view of the above, the hydraulic device 10 (operating by example as a motor) can utilize the housing 300,396 having the inlet 421 for receiving the hydraulic fluid 411 and the outlet 426 for outputting the hydraulic fluid 411, such that the housing 300 has the case area 390 for holding the case fluid 391. Any hydraulic fluid 411 bypassing (e.g. travelling between the main piston 305 and the walls of the main cylinder 306) the main piston 305 (when travelling between the inlet 421 and the outlet 426) enters the case area 390 and becomes the case fluid 391. The hydraulic device 10 further has the primary (e.g. main) cylinder 306 positioned in the housing 300 along a first reciprocation axis 301, the primary cylinder 306 having the input 421 in fluid communication with the inlet line 415 for receiving the hydraulic fluid 411 on a primary intake stroke and an output 426 in fluid communication with the outlet/return line 426 for ejecting the hydraulic fluid 411 from the housing 300 on a primary exhaust stroke. The primary cylinder 306 has the primary (e.g. main) piston 305 positioned for a first reciprocal motion within the primary cylinder 306 along the first reciprocation axis 301, the primary piston 305 having a first end 305*a* exposed to the hydraulic fluid 411 and a second end 305*b* coupled to the actuator surface 310*a* (see FIG. 1). The actuator 310 is driven by the second end 305*b* via the first reciprocal motion, the actuator 310 mounted on the shaft 315 such that the shaft 315 is rotated by the actuator 310. During the first reciprocal motion, the hydraulic fluid 411 is also ejected from the outlet 426. In conjunction with the primary piston 305 and primary cylinder 306, provided is a drain cylinder 330 positioned in the housing 300,396 along a second reciprocation axis 394. Further, the case inlet passage 365 is for receiving the case fluid 391, the case inlet passage 365 fluidly coupled to the case area 390 and fluidly coupled to the drain cylinder 330. Further, the case outlet passage 350 is for outputting the case fluid 391, the case outlet passage 350 also fluidly coupled to the drain cylinder 330. The drain piston 320 is positioned for a second reciprocal motion within the drain cylinder 330 along the second reciprocation axis 394, the drain piston 320 having a third end 320*a* exposed to the case fluid 391 in the drain cylinder 330 and a fourth end 320*b* coupled to the actuator 310 (see FIG. 1). During operation of the hydraulic device 10, a portion of the hydraulic fluid 411 becomes the case fluid 391 when the portion enters the case area 390 and the second reciprocal motion causes the case fluid 391 to be transferred from the case inlet passage 365 to the case outlet passage 350.

The invention claimed is:

1. A hydraulic device comprising:

a housing having an inlet for receiving hydraulic fluid and an outlet for outputting the hydraulic fluid, the housing having a case area for holding case fluid;

a primary cylinder positioned in the housing along a first reciprocation axis, the primary cylinder in fluid communication with the inlet for receiving the hydraulic fluid on a primary intake stroke and in fluid communication with the outlet for ejecting the hydraulic fluid on a primary exhaust stroke;

a primary piston positioned for a first reciprocal motion within the primary cylinder along the first reciprocation axis, the primary piston having a first end exposed to the hydraulic fluid and a second end coupled to an actuator;

the actuator for driving the second end to cause the first reciprocal motion for inducing said ejecting of the hydraulic fluid, the actuator mounted on a shaft;

a drain cylinder positioned in the housing along a second reciprocation axis;

a case inlet for receiving the case fluid, the case inlet located in the case area and fluidly coupled to the drain cylinder;

a case outlet for outputting the case fluid, the case outlet fluidly coupled to the drain cylinder;

a drain piston positioned for a second reciprocal motion within the drain cylinder along the second reciprocation axis, the drain piston having a third end exposed to the case fluid in the drain cylinder and a fourth end coupled to the actuator;

wherein a portion of the hydraulic fluid becomes the case fluid when the portion enters the case area and the second reciprocal motion causes the case fluid to be transferred from the case inlet to the case outlet.

2. The hydraulic device of claim 1 further comprising an inlet check valve positioned with respect to the case inlet, the inlet check valve for inhibiting the case fluid from entering the case inlet during a case exhaust stroke of the second reciprocal motion.

3. The hydraulic device of claim 1 further comprising an outlet check valve positioned with respect to the case outlet, the outlet check valve for inhibiting the case fluid from entering the case outlet during a case intake stroke of the second reciprocal motion.

4. The hydraulic device of claim 1; wherein the drain cylinder is positioned opposite to the primary cylinder on opposite sides of the actuator.

5. The hydraulic device of claim 1, wherein the actuator includes an offset cam, a first cam surface positioned opposite to the second end and a second cam surface positioned opposite to the fourth end.

6. The hydraulic device of claim 5 further comprising a biasing element for biasing the fourth end into contact with the second cam surface during rotation of the shaft.

7. The hydraulic device of claim 6, wherein the biasing element is a return spring located in the drain cylinder.

8. The hydraulic device of claim 1 further comprising a well cavity positioned between the case area and the case inlet, such that a portion of the case fluid resident in the well cavity is positioned lower than bottom surface of the case area.

9. The hydraulic device of claim 1, wherein the second reciprocal motion during a drain intake stroke facilitates case fluid to enter the drain cylinder from the case inlet.

10. The hydraulic device of claim 9, wherein the drain intake stroke creates a vacuum condition in the drain cylinder in order to facilitate the case fluid to enter the drain cylinder from the case inlet.

11. The hydraulic device of claim 1, wherein the second reciprocal motion during a drain intake stroke causes case fluid to enter the drain cylinder from the case inlet.

12. The hydraulic device of claim 1, wherein the portion becomes the case fluid by exiting out of the primary cylinder adjacent to the second end of the primary piston during the first reciprocal motion.

13. The hydraulic device of claim 1 further comprising a drain gallery (335) in fluid communication with the drain cylinder, the drain gallery positioned adjacent to the third end, the drain gallery in fluid communication with the case inlet.

14. The hydraulic device of claim 13 further comprising a plurality of drain pistons and corresponding plurality of drain cylinders, such that each of the plurality of drain cylinders is fluidly coupled to the drain gallery.

15. The hydraulic device of claim 1 further comprising a plurality of drain pistons and corresponding plurality of drain cylinders.

16. The hydraulic device of claim 1 further comprising a vent in the housing for venting the case area to atmosphere.

17. A method for operating a hydraulic device including a housing with a case area for holding case fluid, the hydraulic device coupled to a hydraulic fluid reservoir containing hydraulic fluid, the method comprising the steps of:

rotating an actuator, the actuator coupled to a primary piston and a drain piston;

using the actuator to operate the primary piston within a primary cylinder of the housing in a first reciprocal motion, the primary cylinder receiving the hydraulic fluid on a primary intake stroke and ejecting the hydraulic fluid on a primary exhaust stroke;

using the actuator to operate the drain piston within a drain cylinder of the housing in a second reciprocal motion, the drain cylinder receiving the case fluid on a case intake stoke and outputting the case fluid on a case exhaust stroke;

wherein a portion of the hydraulic fluid becomes the case fluid when the portion enters the case area and the second reciprocal motion causes the case fluid to be transferred from the case inlet to the case outlet.

18. The method of claim 17 further comprising receiving the hydraulic fluid from an inlet of the housing and outputting the hydraulic fluid to an outlet of the housing, such that the inlet is fluidly coupled to the hydraulic fluid reservoir, the hydraulic fluid reservoir is vented to atmosphere.

19. The method of claim 17 further comprising venting the case area to atmosphere.

20. The method of claim 17 further comprising directing the case fluid from the case outlet to the hydraulic fluid reservoir.

21. A hydraulic device comprising:

a housing having an inlet for receiving hydraulic fluid and an outlet for outputting the hydraulic fluid, the housing having a case area for holding case fluid;

a primary cylinder positioned in the housing along a first reciprocation axis, the primary cylinder having an input in fluid communication with the inlet for receiving the hydraulic fluid on a primary intake stroke and an output in fluid communication with the outlet for ejecting the hydraulic fluid on a primary exhaust stroke;

a primary piston positioned for a first reciprocal motion within the primary cylinder along the first reciprocation axis, the primary piston having a first end exposed to the hydraulic fluid and a second end coupled to an actuator;

the actuator being driven by the second end via the first reciprocal motion, the actuator mounted on the shaft such that the shaft is rotated by the actuator;

a drain cylinder positioned in the housing along a second reciprocation axis;

a case inlet for receiving the case fluid, the case inlet located in the case area and fluidly coupled to the drain cylinder;

a case outlet for outputting the case fluid, the case outlet fluidly coupled to the drain cylinder;

a drain piston positioned for a second reciprocal motion within the drain cylinder along the second reciprocation axis, the drain piston having a third end exposed to the case fluid in the drain cylinder and a fourth end coupled to the actuator;

wherein a portion of the hydraulic fluid becomes the case fluid when the portion enters the case area and the second reciprocal motion causes the case fluid to be transferred from the case inlet to the case outlet.

22. A method for operating a hydraulic device including a housing with a case area for holding case fluid, the hydraulic device coupled to a hydraulic fluid reservoir containing hydraulic fluid, the method comprising the steps of:

operating the primary piston within a primary cylinder of the housing in a first reciprocal motion, the primary cylinder receiving the hydraulic fluid on a primary intake stroke and ejecting the hydraulic fluid on a primary exhaust stroke;

driving an actuator by the first reciprocal motion, the actuator coupled to the primary piston, the actuator mounted on a shaft such that said driving causes rotation of the shaft;

operating the drain piston within a drain cylinder of the housing in a second reciprocal motion facilitated by said rotating, the drain cylinder receiving the case fluid on a case intake stoke and outputting the case fluid on a case exhaust stroke, the drain piston coupled to the actuator;

wherein a portion of the hydraulic fluid becomes the case fluid when the portion enters the case area and the second reciprocal motion causes the case fluid to be transferred from the case inlet to the case outlet.

* * * * *